US010721189B1

(12) United States Patent
Gau (10) Patent No.: US 10,721,189 B1
(45) Date of Patent: Jul. 21, 2020

(54) ADVERTISING SYSTEMS AND METHODS EMPLOYING JAVASCRIPT OBJECT NOTATION

(71) Applicant: AMERICAN INNOVATIVE APPLICATIONS CORPORATION, Clarksville, VA (US)

(72) Inventor: Shane Gau, Clarksville, VA (US)

(73) Assignee: American Innovative Applications Corporation, Clarksville, VA (US)

( * ) Notice: Subject to any disclaimer, the term of this patent is extended or adjusted under 35 U.S.C. 154(b) by 104 days.

(21) Appl. No.: 16/001,752

(22) Filed: Jun. 6, 2018

Related U.S. Application Data

(60) Provisional application No. 62/516,321, filed on Jun. 7, 2017.

(51) Int. Cl.
*G06F 15/16* (2006.01)
*H04L 12/58* (2006.01)
*G06Q 30/02* (2012.01)
*H04L 29/06* (2006.01)
*G06Q 30/06* (2012.01)
*G06Q 50/00* (2012.01)

(52) U.S. Cl.
CPC ......... *H04L 51/02* (2013.01); *G06Q 30/0277* (2013.01); *H04L 51/10* (2013.01); *G06Q 30/0617* (2013.01); *G06Q 50/01* (2013.01); *H04L 67/42* (2013.01)

(58) Field of Classification Search
CPC ......... H04L 51/02; H04L 67/42; H04L 51/10; G06Q 30/0277
See application file for complete search history.

(56) References Cited

U.S. PATENT DOCUMENTS

| 7,761,526 | B2 * | 7/2010 | Pounds | G06Q 30/0251 709/206 |
| 2006/0031144 | A1 * | 2/2006 | Todd | G06Q 30/06 705/26.43 |
| 2008/0155030 | A1 * | 6/2008 | Fortier | H04L 51/04 709/206 |
| 2012/0209926 | A1 * | 8/2012 | Backholm | G06Q 50/01 709/206 |
| 2013/0182001 | A1 * | 7/2013 | Hwang | G06Q 30/02 345/581 |
| 2014/0115658 | A1 * | 4/2014 | Ayodele | G06F 21/6263 726/1 |
| 2014/0136990 | A1 * | 5/2014 | Gonnen | H04L 51/18 715/752 |

(Continued)

*Primary Examiner* — Razu A Miah
(74) *Attorney, Agent, or Firm* — Foley & Lardner LLP (57) ABSTRACT

A JSON advertising system includes an ad management system, a bot builder module, a social network platform, a bot platform, and a client, all mutually connected via a suitable network. An advertiser stores an ad creative into an ad server located in the ad management system, and generates JSON code via a JSON code tool within the bot builder module for each part of advertisement content stored in the ad server. Then, a client logs into a social network platform news feed, retrieving and displaying the advertisement. A user engages the ad and is redirected to a bot platform chat interface, retrieving bot advertisement content from a bot server and linking the content to the advertisement stored in the ad server as determined by the JSON code.

20 Claims, 5 Drawing Sheets

(56) References Cited

U.S. PATENT DOCUMENTS

| | | | |
|---|---|---|---|
| 2014/0201239 A1* | 7/2014 | Liu | H04L 51/02 |
| | | | 707/770 |
| 2014/0280915 A1* | 9/2014 | Nemer | G06Q 30/0214 |
| | | | 709/224 |
| 2015/0006659 A1* | 1/2015 | Cai | G06Q 50/01 |
| | | | 709/206 |
| 2015/0172244 A1* | 6/2015 | Jeong | G06Q 10/101 |
| | | | 709/206 |
| 2015/0271116 A1* | 9/2015 | Huang | H04L 51/04 |
| | | | 709/206 |
| 2016/0006856 A1* | 1/2016 | Bruno | G06F 16/951 |
| | | | 715/809 |
| 2016/0042420 A1* | 2/2016 | Purcell | G06Q 30/0613 |
| | | | 705/26.41 |
| 2016/0092914 A1* | 3/2016 | Wiener | G06Q 30/0246 |
| | | | 705/14.45 |
| 2016/0094492 A1* | 3/2016 | Li | H04L 51/02 |
| | | | 709/206 |
| 2016/0094507 A1* | 3/2016 | Li | G06F 16/951 |
| | | | 709/206 |
| 2016/0149836 A1* | 5/2016 | Narayanan | H04L 67/42 |
| | | | 709/206 |
| 2016/0226803 A1* | 8/2016 | Ashoori | G06K 9/4671 |
| 2017/0093769 A1* | 3/2017 | Lind | G06F 3/0481 |
| 2017/0171117 A1* | 6/2017 | Carr | H04L 51/02 |
| 2017/0230320 A1* | 8/2017 | Knight | H04L 51/10 |
| 2017/0357442 A1* | 12/2017 | Peterson | G06F 3/0482 |

* cited by examiner

FIG. 5

ADVERTISING SYSTEMS AND METHODS EMPLOYING JAVASCRIPT OBJECT NOTATION

CROSS-REFERENCE TO RELATED APPLICATIONS

This application claims priority to U.S. Provisional Patent Application Ser. No. 62/516,321, filed on Jun. 7, 2017, which is hereby incorporated by reference in their entirety.

TECHNICAL FIELD

The present invention generally relates to computer systems, and more specifically to advertising systems and methods employing JavaScript Object Notation (JSON) embedded in a bot builder for transfer of content to automated agent (bot) platforms.

BACKGROUND

Conventionally, in order to increase business efficiency and customer satisfaction, some businesses may utilize an automated conversation agent, or bot, implemented by a computer program with a suitable backend, to answer questions from customers or to perform tasks for them. In this regard, various developers have produced bot building platforms, or bot builders, that allow interested business entities to build customized bots that match their needs.

In recent times, advertisers, regardless of the platform they use (e.g. websites and bots), have opted for the usage of JavaScript Object Notation (JSON), an open standard data format that uses objects made from key/value pairs, for delivering ad content directly into a publisher's system. Unlike common JavaScript tags that do not use JSON, which render ads directly in a browser, when a request is made via a browser call to the ad server's Application Programming Interface (API), the JSON response includes the raw ad contents including ad metadata. The raw ad contents may contain either all the elements used to form an ad in a Content Managing System (CMS), or a reference to an ad stored on the publisher's side. The fact that JSON doesn't render ads in a browser makes it the ideal format for creating native ads. A publisher's CMS can ingest the ads any way the publisher thinks it is suitable, and style the ads in ways appropriate for their content.

Although JSON represents a highly-suitable data format for advertising on publishers' channels, some level of coding expertise is useful in order to create ads coded using JSON. As a consequence, in the case that an advertiser or publisher (such as a bot admin) is not a coder, the advertiser or publisher may contact their platform administrator to create the JSON code or may desire to have a member in the team with enough coding expertise, thereby making it an inefficient approach for advertising.

SUMMARY

For the aforementioned reasons, there is a continuing need for improvement of technology that enables average, non-coder users to create JSON code inside a bot builder for advertising inside a bot platform. The current disclosure relates to an advertising system and method that allows bot builder users to retrieve and insert JavaScript Object Notation (JSON) code that deep links to advertisements creatives contained in an ad server. The system and method of the current helps to overcome drawbacks from other technologies that require a bot builder user or website administrator to have coding expertise to be able to write down JSON code to suitably advertise on their platforms.

According to an embodiment, the JSON advertising system and method includes an ad management system, a bot builder module, a social network platform, a bot platform, and a client, all connected to each other via a suitable network such as the World Wide Web (WWW), or any other wide area network or local area network. Initially, an advertiser, which may be a bot builder administrator or any other suitable member of a bot builder team, may create an advertisement employing a suitable advertising platform. When creating the advertisement, the advertiser may employ a JSON code tool within the bot builder module to generate JSON code for every part of ad content created in the advertising platform, inserting this JSON code into the ad platform in order to deep link the JSON code to the advertisement. Subsequently, a client connects the JSON code to a social network platform, retrieving the ad from the ad server and rendering said advertisement in the social network platform. The user may then engage the ad and the server may redirect the user to a bot platform chat interface. Engaging the rendered advertisement prompts the bot server to provide bot advertisement content to the bot platform chat interface, which through the JSON code inserted in the ad platform, deep links to the advertisement stored in the ad server. The user may then interact with the bot and receive bot advertisement content.

According to an embodiment, the JSON advertising system disclosed herein may include a bot connected to channels via a bot connector. The bot may include a bot server configured to enable integration and communication with the JSON advertising system and to provide bot content. The bot connector may include different functions including route messaging, messages state, bot registration, directory session tracking services (translation), per-user and per-bot storage, software kit development (SDK), and application programming interfaces (APIs), amongst others.

In some embodiments, a computer-implemented method may include receiving, by a first server from a first computing device, a set of attributes for a media element comprising at least a first attribute corresponding to a graphical representation of the media element and a second attribute corresponding to one or more bot queries associated with the media element. The computer-implemented method may further include generating, by the server utilizing an asynchronous browser-server communication format, a set of code representing the media element, the set of code being configured to cause the media element to be displayed in accordance with the first attribute and further configured to link the media element to a chatbot application corresponding to the second attribute. The computer-implemented method may further include, in response to receiving a request from the first computing device, transmitting, by the first server, the set of code to a second server configured to display the media element on a second computing device operated by a second user. The computer-implemented method may further include, in response to receiving an indication that the second computing device has activated with the media element, causing, by the first server, the second computing device to initiate a chatbot session via the chatbot application configured to: initiate a chat session between the second computing device and the first server, display one or more bot queries in accordance with the second attribute received from the first computing device, and receive one or more responses from the second computing device. The computer-implemented method may further include transmitting, by the first server, the one or more responses to the first computing device.

In some embodiments, a computer system may include a first computing device and a first server. The first server is configured to receive from the first computing device a set of attributes for a media element comprising at least a first attribute corresponding to a graphical representation of the media element and a second attribute corresponding to one or more bot queries associated with the media element. The first server is further configured to generate utilizing an asynchronous browser-server communication format, a set of code representing the media element, the set of code being configured to cause the media element to be displayed in accordance with the first attribute and further configured to link the media element to a chatbot application corresponding to the second attribute. The first server is further configured to, in response to receiving a request from the first computing device, transmit the set of code to a second server configured to display the media element on a second computing device operated by a second user. The first server is further configured to, in response to receiving an indication that the second computing device has activated with the media element, cause the second computing device to initiate a chatbot session via the chatbot application configured to: initiate a chat session between the second computing device and the first server, display one or more bot queries in accordance with the second attribute received from the first computing device, and receive one or more responses from the second computing device. The first server is further configured to transmit the one or more responses to the first computing device.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present invention will be apparent from the accompanying drawings and from the detailed description that follows below.

BRIEF DESCRIPTION OF THE DRAWINGS

The disclosure may be best understood by referring to the following description and accompanying drawings that are used to illustrate embodiments of the disclosure by way of example and not limitation, without departing from the spirit and scope of the disclosure. In the drawings, like reference numerals indicate similar elements.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

The current disclosure will be described in the context of a bot builder admin who, through the JavaScript Object Notation (JSON) advertising system and method, is enabled to create an advertising in an ad platform and simultaneously request, extract and insert JSON code that deep links to the advertising content. The advertising is stored at an ad server via the World Wide Web (WWW), or any other wide area network or local area network. The JSON advertising system and method additionally includes user engagement methods thereof, which involve an ad request from a client logged into a social network, thereafter requesting and rendering the advertising in the social network. The user may then engage with the ad, connecting said user to a chat application for interacting with a bot and viewing bot content related and linked to the ad as determined by the JSON code. Enabling any bot builder user to request, extract, and insert JSON code may represent a highly efficient and attractive alternative for bot builders to insert ads in their bot platforms without needing highly specialized personnel such as coders or without the need to contact the bot builder administrators.

The JSON advertising system and method may be implemented in any suitable hardware, software, or combinations thereof. When implemented in hardware, the JSON advertising system and method may be implemented using specialized hardware elements and logic. When the system and method for client-side advertisement retrieval is implemented in software, the software can be used to control the various components in a system and network associated with the program. The software can be stored in a memory and executed by a suitable instruction execution system, such as a microprocessor. The hardware implementation of the JSON advertising system and method can include any or a combination of the following technologies known in the art: discrete electronic components, discrete logic circuits having logic gates for implementing logic functions upon data signals, an application-specific integrated circuit having appropriate logic gates, one or more programmable gate array (PGA), a field programmable gate array (FPGA), and the like.

The software utilized for the JSON advertising system and method may include an ordered listing of executable instructions for implementing logical functions, and can be embodied in any computer-readable medium for use by or in connection with an instruction execution system, apparatus, or device, such as a computer-based system, processor-containing system, or other system that may retrieve the instructions from the instruction execution system, apparatus, or device and execute the instructions.

A "computer-readable medium" herein refers to any suitable means that may contain, store, communicate, propagate, or transport the program for use by or in connection with the instruction execution system, apparatus, or device. The computer-readable medium may be an electronic, magnetic, optical, electromagnetic, infrared, or semiconductor system, apparatus, device, or propagation medium, amongst others. More specific examples of the computer-readable medium may include a portable computer diskette (magnetic), a random-access memory (RAM), a read-only memory (ROM), an erasable programmable read-only memory (EPROM or Flash memory) (magnetic), an optical fiber (optical), and a portable compact disc read-only memory (CDROM) (optical), amongst others.

In the detailed description below, the terms "advertising", "advertisement", "ad creative", "advertiser", and "bots", and "bot advertisement content" or "bot ad content" will be used. As used herein, an "advertisement" is a general term that represents the final product of an advertisement appearing on a bot platform chat application, or whatever suitable media is being used. An "advertisement creative" or "ad creative" is the code that is defined to request creative assets to show an advertisement on a page such as a social network platform news feed. The "ad creative" can be HTML, plain text, JavaScript or any other type of code or script that can be interpreted by a browser in a client device. An "advertiser" is a bot builder company or individual who owns a product that he wants to advertise through a social network and bot chat application. The term "bots" herein refers to automated agents, or computer-implemented modules, rather than human agents, which perform roles and engage in interactions that are otherwise analogous to human contacts. The term "bot advertisement content" or "bot ad content" refers to information and services, may include web objects (text, graphics and scripts), downloadable objects (media files, software, documents), and the like, all of which may be provided at a bot chat interface and which deep link to an advertisement through a JSON code.

Figure 1:
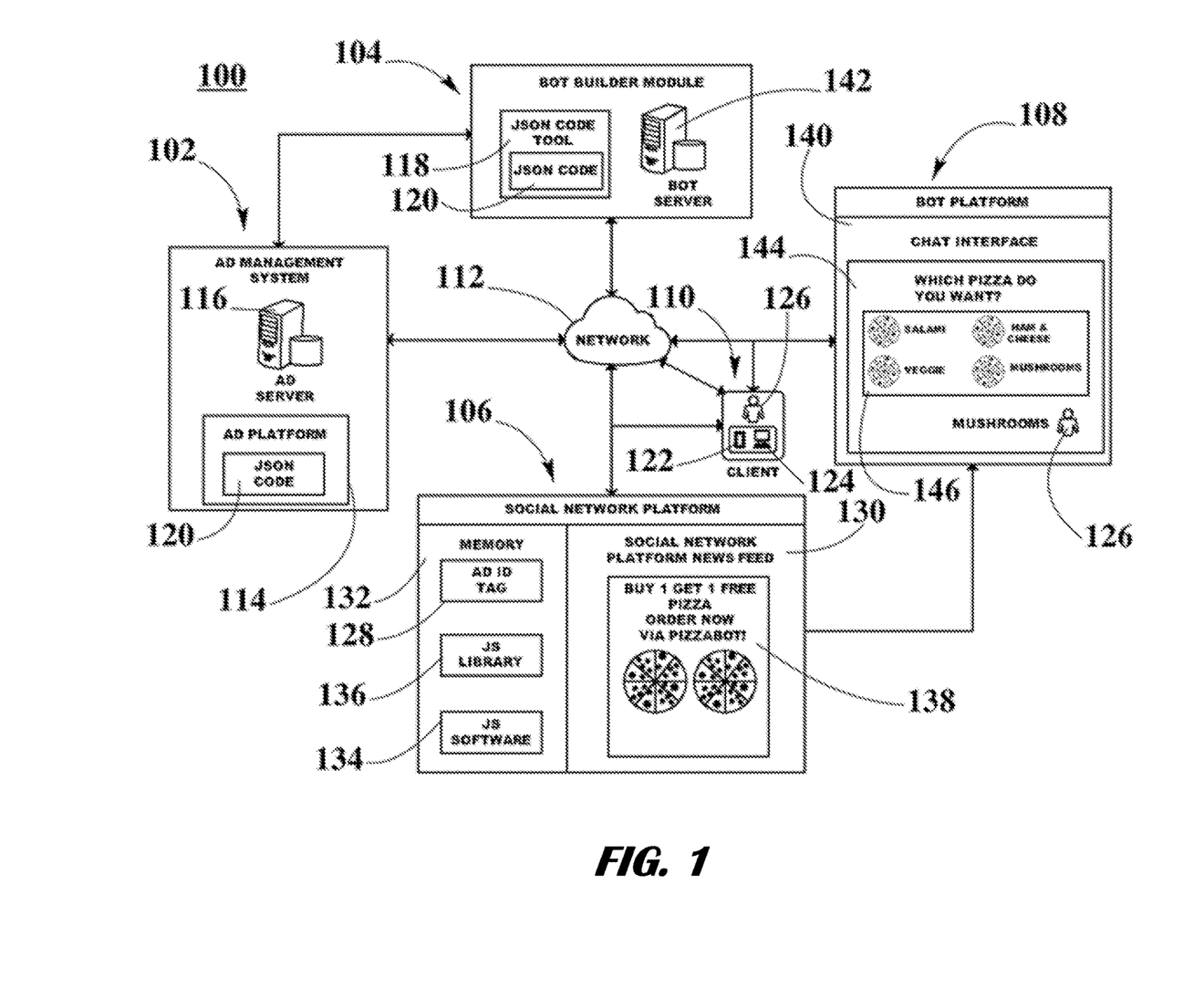
FIG. 1 illustrates a JavaScript Object Notation (JSON) advertising system, according to an embodiment.

FIG. 1 illustrates a JavaScript Object Notation (JSON) advertising system (JSON advertising system 100), according to an embodiment. The JSON advertising system 100 includes an advertisement management system 102, a bot builder module 104, a social network platform 106, bot platform 108, and a client 110, all connected to each other through a network 112 such as the World Wide Web (WWW) or any other network. The examples of the network 112 may include, but are not limited to, private or public LAN, WLAN, MAN, WAN, and the Internet. The network 112 may include both wired and wireless communications according to one or more standards and/or via one or more transport mediums. The communication over the network 112 may be performed in accordance with various communication protocols such as Transmission Control Protocol and Internet Protocol (TCP/IP), User Datagram Protocol (UDP), and IEEE communication protocols. In one example, the network 112 may include wireless communications according to Bluetooth specification sets, or another standard or proprietary wireless communication protocol. In another example, the network 112 may also include communications over a cellular network, including, e.g. a GSM (Global System for Mobile Communications), CDMA (Code Division Multiple Access), EDGE (Enhanced Data for Global Evolution) network.

Advertisement Creation

In at least an initial step of the advertisement creation, an advertiser, which may be a bot builder administrator or any other suitable member of the bot builder team, may create an advertisement employing a suitable advertising platform 114 of the advertisement management system 102. The process of creating the ad through the advertising platform 114 may include storing one or more ad creatives in an ad server 116 within the advertisement management system 102.

When creating the advertisement, the advertiser may employ a JSON code tool 118 within the bot builder module 104 to generate JSON code 120 for every bit of ad content created in the advertising platform 114. This JSON code 120 may then be inserted into the ad platform 114 in order to deep link the JSON code 120 to the advertisement. For instance, the as platform 114 may be a graphical user interface with various input fields and elements configured to receive attributes of the advertisement. In this way, a user who is not familiar with JSON coding language may visually customize a media element (e.g., graphical components of the advertisement) and a server (e.g., server 116) may then generate a JSON code corresponding to the user's inputs.

In some embodiments, JSON or JavaScript Object notation, is a data interchange format that is defined as a subset of JavaScript Programming Language. JavaScript is a scripting language used to enable scripting access to objects embedded in applications. The scripting languages may be used to open or pop up a new window with programmatic control over the size, position and look of the new window or to validate web form input values before they are submitted to a server. JSON is a text-based, human-readable format for representing simple data structures and associative arrays (called objects). In some cases, the JSON syntax is defined with a collection of name/value pairs and an ordered list of values. The JSON format is used for transmitting structured data over a network connection in a process called serialization. In some cases, JSON is used for sending structured data over the wire (e.g., the network 112).

Advertisement Rendering in Social Network Platform News Feed and User Engagement Subsequently, a client 110, which may refer to suitable computing devices such as mobile devices 122 or personal computers (PC 124) connected to a network 112 and being used by a user 126, connects to the social network platform 106. In some embodiments, the client 110 may comprise a processor, a memory, and is capable of performing the various tasks and processes described herein, such as providing a GUI interface to a user to interact with a social network platform 106 via its website. Mobile device 122 is representative of a variety of small and portable devices including, for example, mobile phones, smart phones, PDAs (personal digital assistant), handheld game devices, portable media players, and the like. Alternatives to the PC 124 may include devices such as set top boxes, media centers, game consoles, and the like.

In some embodiments, the client 110 is used by a user to interact with a webserver hosting websites of the social network platform 106. The client 110 may execute an Internet browser or local application that access the webserver in order access the websites of the social network platform 106. The client 110 may transmit credentials from user inputs to the webserver, from which the webserver may authenticate the user. The client 110 may comprise any number of input devices configured to receive any number of data inputs (e.g., mouse, keyboard, touchscreen, stylus), including various types of data inputs allowing for authentication, e.g., username, passwords, certificates, biometrics. One having skill in the art would also appreciate that the client 110 may be any device comprising a processor and non-transitory machine-readable storage medium allowing the client 110 to perform the various tasks and processes described herein.

As an example of the client 110 operation, the client 110 may execute a browser that accesses a webserver hosting websites of the social network platform 106 that allows for users to access the social network platform 106. Using the client 110, a user 126 may generate a request initiated by an ad identification tag 128, and the ad server 116 receives the single request from the client 110 initiated by the ad identification tag 128, which allows the advertisement management system 102 to select the one or more appropriate ad creatives to be sent and rendered at the social network platform news feed 130.

For instance, client 110 may user the advertisement management system 110 to create multiple advertisements. The client 110 may also categorize each advertisement using an Id tag (e.g., Wednesday ad, pizza ad, ad suitable for teenagers, and the like). The client 110 may then identify each advertisement using its unique Id tag. The ad identification tag 128 can be, for example, a script tag, such as a JavaScript tag, that specifies to the advertisement management system 102 all of the suitable ad types that appear in the social network platform news feed 130.

In order to suitably render the advertisement in the social network platform news feed 130, the ad server 116 sends the ad creative to the memory 132 of the social network platform 106. Then, a JavaScript software 134 makes calls to a JavaScript library 136 that interprets and renders the ad creative to insert an advertisement in the social network platform news feed 130. The rendered advertisement 138 includes advertisement content such as an image file (JPG, GIF, PNG), Flash file, video file, and the like. For instance, server 116 may either directly send the JSON code or a link (representing the advertisement) to the social networking platform. The social networking platform can then use the JSON code to render the advertisement. After the rendered advertisement 138 is displayed in the social network platform news feed 130, a user 126 may click on the rendered advertisement 138.

Displaying of Advertisement Bot Content and User-Bot Interaction in Bot Platform Chat Interface After an end user (e.g., the user 126) has engaged the rendered advertisement 138 by clicking on said rendered advertisement 138, the end user may be redirected to a bot platform chat interface 140. Engaging the rendered advertisement 138 prompts the bot server 142 to provide bot advertisement content 144 to the bot platform chat interface 140, which through the JSON code 120 inserted in the ad platform 114, deep links to the advertisement stored in the ad server 116.

Thus, in the sample embodiment shown in FIG. 1, a rendered advertisement 138 displayed in the social network platform news feed 130 is a "buy 1, get 1 free pizza—order now via pizzabot", whereas the bot advertisement content 144 is displayed as a pizza menu 146 that the user 126 may engage. Using JSON code 120 to deep link the bot advertisement content 144 to the original advertisement creative stored in the ad server 116 allows the bot platform to generate dynamic bot advertisement content 144 that may include a different content including variations in style, text, colors, images, and files as compared to the original rendered advertisement 138 displayed in the social network platform 106. The bot advertisement content 144 may be any information about the advertisement and/or any bot queries (e.g., questions) inputted by the creator of the advertisement. For instance, when creating an advertisement, a client may input graphical attributes of the advertisement (e.g., how the advertisement looks) and input attributes of the product (e.g., price of the product, various specification information about the product, or some questions to be asked from the end-user).

As may be understood, in this simple rendered advertisement 138, a user 126 may be attracted to an offer or other advertisement information that is related to the main product of the company that has built the bot platform 108. This offer or other advertisement information can only be obtained by going to the bot platform chat interface 140 and interacting with the bot, driving traffic to the bot platform 108, increasing product awareness, and potentially increasing sales.

Figure 2:
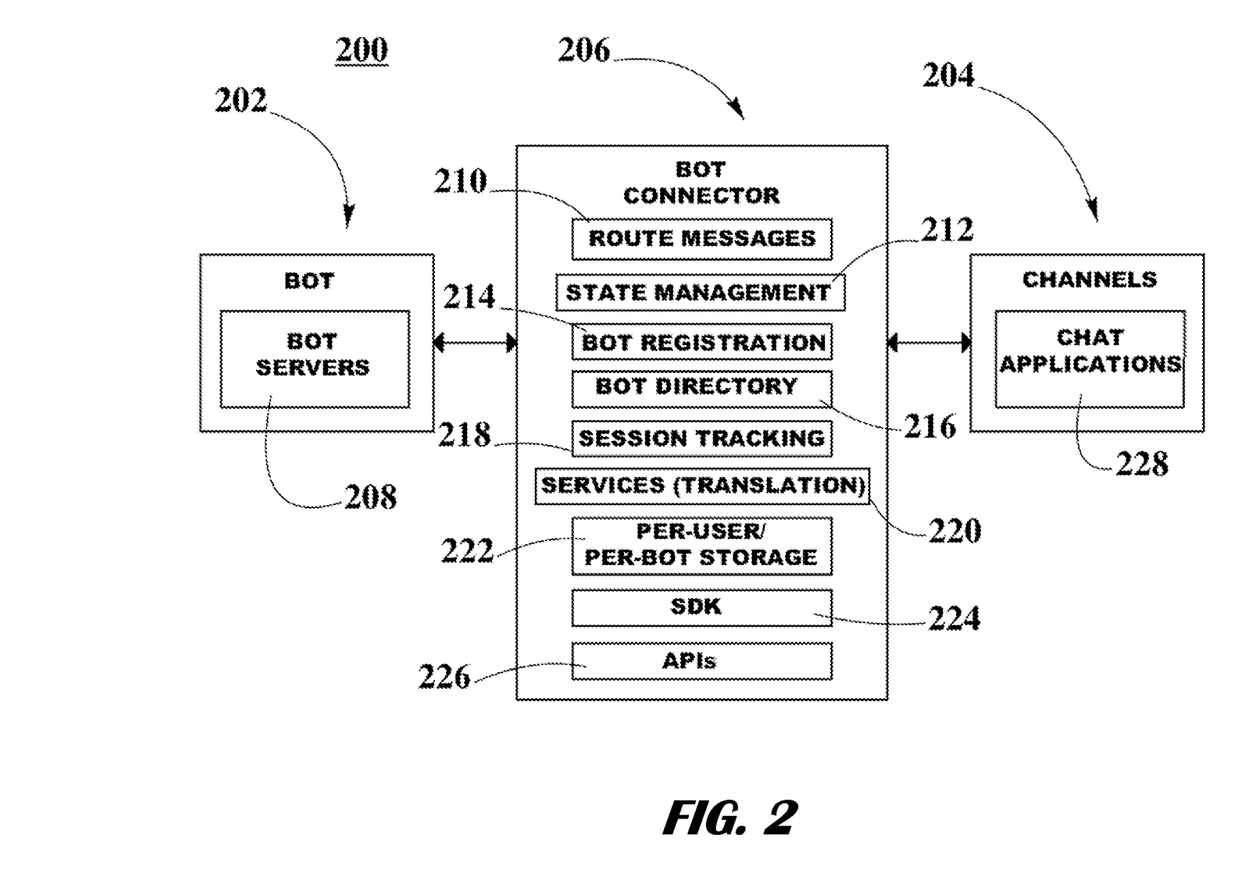
FIG. 2 illustrates a bot diagram that may be employed in the JSON advertising system, according to an embodiment.

FIG. 2 illustrates a bot diagram 200 that may be employed by the bot platform 108 of the JSON advertising system 100, according to an embodiment. In FIG. 2, a bot 202 is connected to channels 204 via bot connector 206. Bot 202 may act as an automated agent that communicates and interacts with a human user through bot platform 108 employing channels 204 and connecting through bot connector 206. Bot 202 simulates an intelligent conversation with a human user, meaning that most human-bot interactions are defined by a natural, almost human behavior and language. These interactions typically include providing bot content to a human user. Bot content, which refers to information and services, may include web objects (text, graphics and scripts), downloadable objects (media files, software, documents), and the like, all of which may be available at bot content delivery network servers (not shown). Bot 202 may include a bot servers 208 for connection to JSON advertising system 100.

Bot connector 206 may include several functions, such as routing messages 210 from a user via channels 204 to bot 202 and vice-versa; performing state management 212, meaning to manage all stored data within bot connector 206 at a given instant in time; performing bot registration 214 and managing a bot directory 216, allowing developers to release different bots 202 to the public; performing session tracking 218, which is a way to track and maintain state of a user; performing services 220 such as translation; allowing for per-user and per-bot storage 222, referring to data storage per particular user related to a corresponding bot 202; enabling access to a software development kit (SDK 224), enabling development of new bots 202 and modification of existing bots 202; and allowing access to application programming interfaces (APIs 226) serving as interfaces for bots 202 and channels 204 to communicate, with each other and for performing standard CRUD (create, read, update, delete) operations. Channels 204 may include suitable chat applications 228 such as Facebook Messenger™, LINE™, Skype™, Slack™, Skype™, and WhatsApp™, amongst others.

Figure 3:
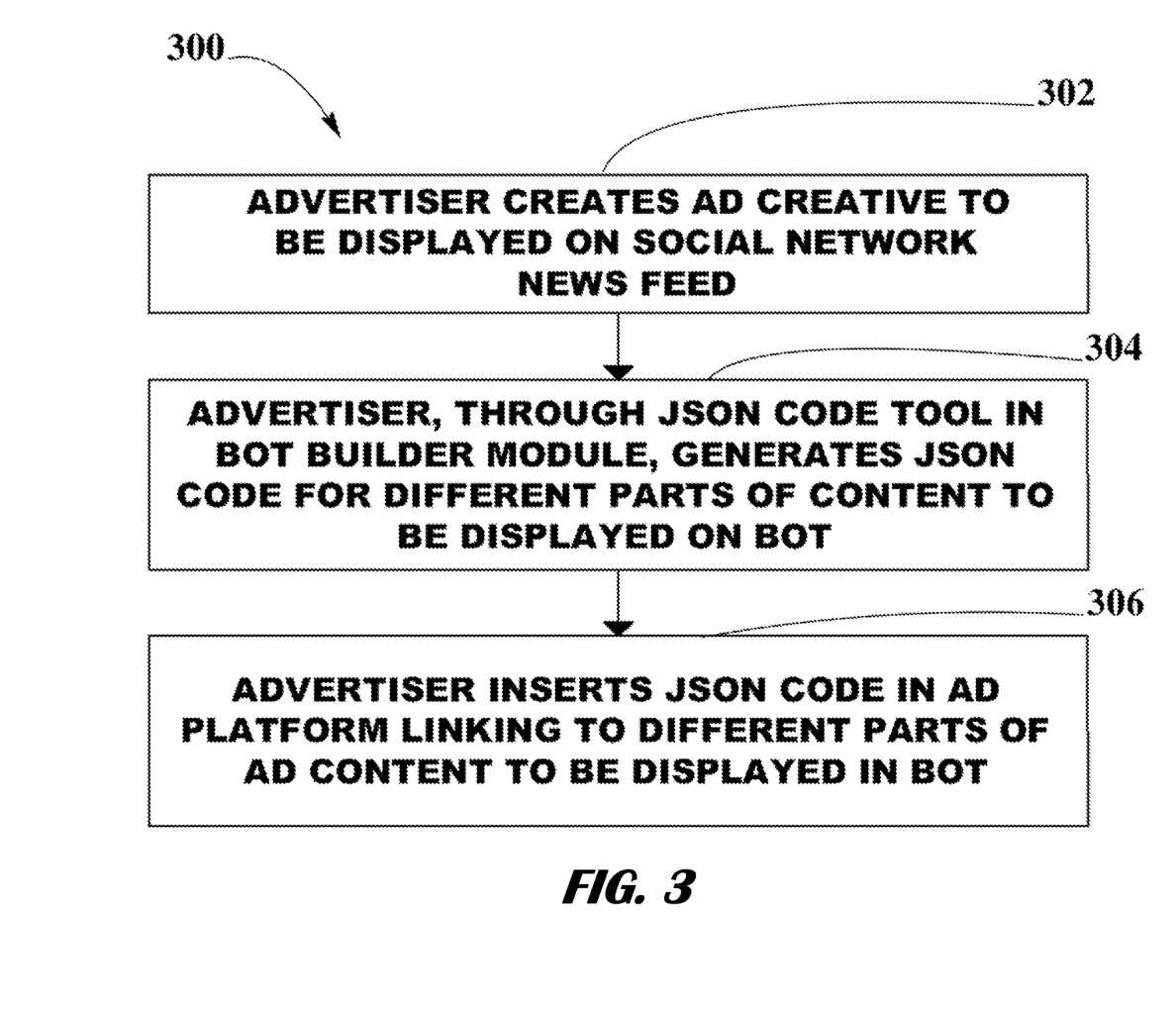
FIG. 3 illustrates a method for a bot creator admin to create an ad media element, according to an embodiment.

FIG. 3 illustrates an advertisement creation method 300, according to an embodiment, which begins with the creation of an ad creative 302 by an advertiser according to the advertisement to be displayed on a social network platform news feed 130. The ad creative is stored in the ad server 116 from the advertisement management system 102. Subsequently, the advertisement creation method 300 follows by the creation of JSON code 304, which is done by the advertiser for every bit of content of the ad creative employing the JSON code tool 118. This JSON code 120 will be used to link bot advertisement content 144 to the original ad creative stored in the ad server 116. Finally, the advertisement creation method 300 ends by the JSON code insertion in ad platform 306. The advertisement creation method 300 helps to overcome drawbacks from other methods and systems that require a bot builder user or website administrator to have coding expertise to be able to write down JSON code 120 to suitably advertise on their platforms.

Figure 4:
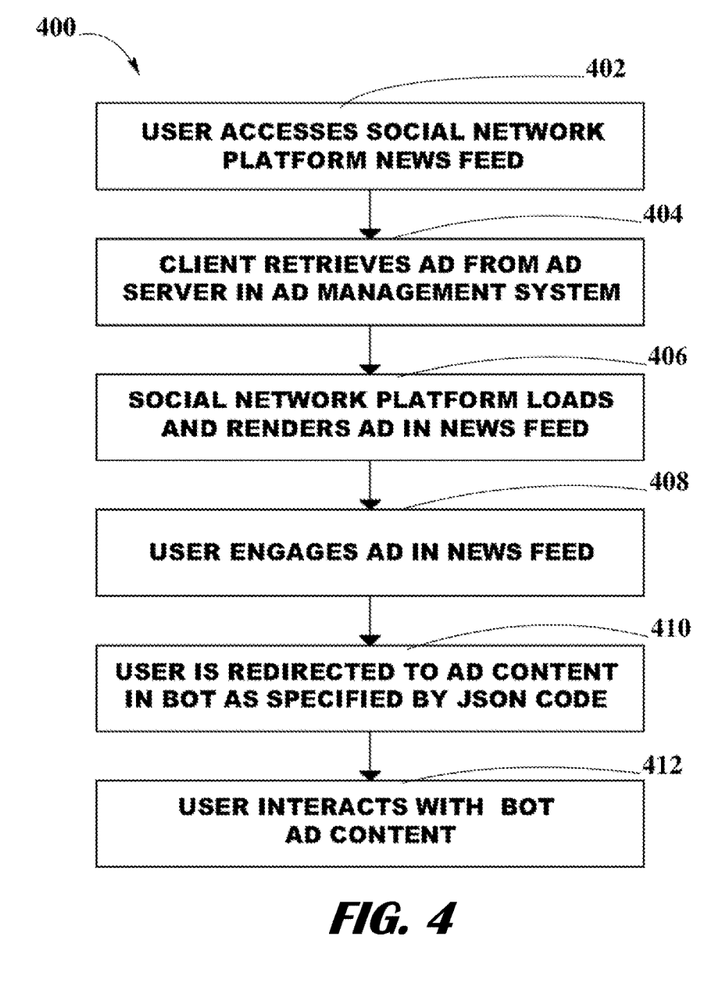
FIG. 4 illustrates a bot advertisement content engagement method, which may take place after the advertisement creation method depicted in FIG. 3, according to an embodiment.

FIG. 4 illustrates a bot advertisement content engagement method 400, which may take place after the advertisement creation method 300 explained in FIG. 3, according to an embodiment. The bot advertisement content engagement method 400 may start when a user accesses a social network platform news feed 402. Subsequently, the client retrieves the ad from ad server 404, resulting in the social network platform loading and rendering the ad 406 in the social network platform news feed 130. Afterwards, the user engages ad 408 in social network platform news feed 130, redirecting the user to the ad content in the bot 410. At this moment, the bot server 142 provides bot advertisement content 144 to the bot platform chat interface 140 which, through the JSON code 120 inserted in the ad platform 114, deep links to the advertisement stored in the ad server 116. Finally, the user interacts with the bot advertisement content 412.

In one embodiment, a JavaScript Object Notation (JSON) advertising system comprises an ad management system, a bot builder module, a social network platform, a bot platform, and a client, all connected to one another via a suitable network such as the World Wide Web (WWW), or any other wide area network or local area network, and wherein: said ad management system comprises at least an ad server and an ad platform; said bot builder module comprises a JSON interface, a JSON code tool, and a bot server; and said social network platform comprises a memory and a social network platform news feed, said memory comprising an ad ID tag, a JavaScript library, and a JavaScript software.

Figure 5:
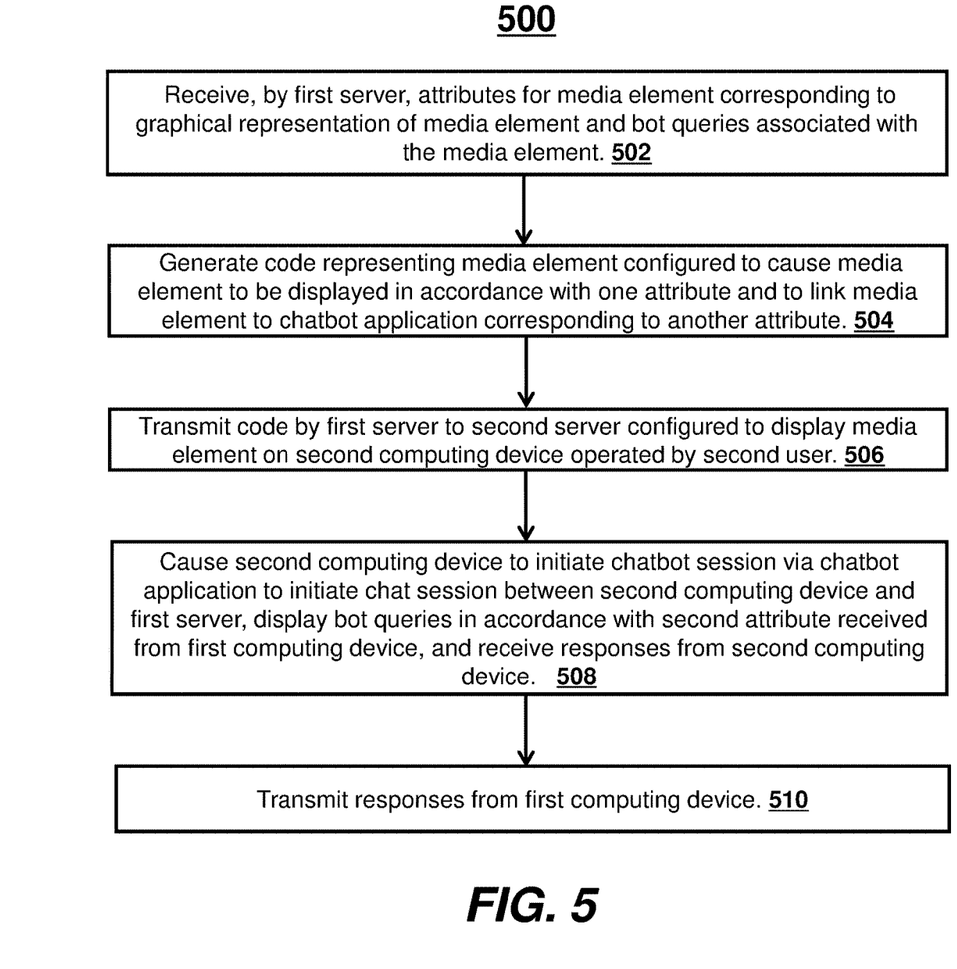
FIG. 5 illustrates a method for employing JavaScript Object Notation (JSON) embedded in a bot builder for transferring of content to automated agent (bot) platforms, according to an embodiment.

FIG. 5 shows execution steps for employing JavaScript Object Notation (JSON) embedded in a bot builder for transferring of content to automated agent (bot) platforms, according to a method 500. The method 500 shown in FIG. 5 comprises execution steps 502, 504, 506, 508, and 510. However, it should be appreciated that other embodiments may comprise additional or alternative execution steps, or may omit one or more steps altogether. Other embodiments may perform certain execution steps in a different order; steps may also be performed simultaneously or near-simultaneously with one another. In addition, the method 500 of FIG. 5 is described as being executed by a single server computer in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the first server described herein.

In a first step 502, a first server may receive, from a first computing device, a set of attributes for a media element such as an advertisement. The first server and the first computing device may be any computing device comprising a processor and non-transitory machine-readable storage medium, and capable of performing various tasks and processes described herein during execution. Non-limiting examples of the first server and the first computing device may include a desktop computer, a laptop computer, a tablet computer, a mobile device, and the like. The first computing device may include a display screen, which is configured to enter input data and display output data, which may be a text string, consisting of a string of characters that are drawn from a predefined alphabet. The display screen may be an LCD screen, computer monitor, or the like, which displays a graphical user interface for a user to edit the text string. The first computing device may include an input device, such as a keyboard or touch or writable screen, and/or a cursor control device, such as mouse, trackball, or the like, for editing text string and for communicating user input information and command selections to other devices. The display screen and the input device may be directly linked to the first computing device, by a wired or wireless connection.

In some embodiments, the first computing device may transmit the set of attributes for the media element to the first server without any request from the first server. In some embodiments, a first server may generate and transmit a request to a first computing device to obtain a set of attributes for a media element. Upon receipt of the request, the first computing device may then transmit the set of attributes for the media element to the first server. The set of attributes may be displayed on a graphical user interface of the first server and processed by a processor of the first server.

The set of attributes for the media element may include a first attribute for the media element and a second attribute for the media element. In some embodiments, the set of attributes may include more than two attributes for the media element without limiting the scope of the disclosed embodiments. The first attribute may correspond to a graphical representation of the media element. In some embodiments, the first attribute for the media element may include a graphical element to be displayed within the media element. The graphical element may include, but not limited to, an image, a video, an animation, or the like. The second attribute for the media element may correspond to one or more bot queries associated with the media element. The one or more bot queries may be in text format.

In a non-limiting example, the first server may display a graphical user interface comprising various inputs configured to receive the first and the second attribute from a client computing device (e.g., first computing device). For instance, a client operating the first computing device may log into a website operated by the first server and may use the input fields to input the attributes of the media elements (e.g., advertisement). The attributes may comprise two separate categories of attributes of the media element. The first category may correspond to graphical attributes of the media element. For instance, the first attribute may be any attribute describing how the media element looks or feels. In a non-limiting example, the client may upload an image and modify the image (e.g., crop, sharpen, change the size, add text, and the like). This image (and the modifications made by the client) may be advertisement that the user desires. Further, the first server may also receive other media elements to display along with the advertisement. For instance, the first server may receive a video, gif, or a sound to display/play alongside the advertisement.

The second category may be specific information regarding the product advertised. The first server may use the second attribute to create and operate a chatbot application. For instance, the first server may inquire and receive all relevant attributes (e.g., price, size, availability, color, taste, and the like) of the product. In some configurations, the first server may also receive specific questions to be asked by the chatbot application. For instance, the client may desire the chatbot to ask the end user regarding various pizza toppings selections. Using the data received (e.g., second attribute), the first server may generate a bot and communicate product data and/or ask the bot queries from the end user. For example, when the end user inquiries about available colors, the first server may retrieve and display an answer that corresponds to the available colors inputted by the first computing device. In some other examples, the bot application (operated by the first server) may inquire the user regarding the end user's favorite toppings. Even though, the bot application (e.g., chatbot) has been described as being operationally coupled to the first server, in some embodiments, the chatbot may be executed (e.g., generated, rendered, or operationally controlled) by a third-party server.

In a next step 504, a first server may generate a set of code representing the media element. In some embodiments, the first server may generate the set of code representing the media element utilizing an asynchronous browser-server communication format. In some embodiments, the set of code maybe a JavaScript Object Notation (JSON) code, which is generated using JSON data-interchange format based on a subset of the JavaScript Programming Language. The JSON format may uses conventions that are familiar to programmers of the C-family of languages, including C, C++, C #, Java, JavaScript, Perl, Python, and many others. The set of code may represent the media element and may be generated based on the first and/or the second attribute. The set of code may also be used to render the media element. For instance, a second server (e.g., social network-ing platform server) may use the set of code to render the media element in accordance with the first and the second attribute.

A first server may generate the set of code such as the JSON code based on two structures. One of the structure is a collection of name/value pairs. In various programming languages, the collection of name/value pairs is realized as an object, record, dictionary, hash table, keyed list, or associative array. Another structure may be an ordered list of values. In various programming languages, the ordered list of values may be realized as an array, vector, list, or sequence.

A set of code is executable code intended to run on the first computing device. In one implementation, the set of code written in JavaScript (JS) is configured to detect empty space on a GUI of a first computing device or any other device, retrieve advertisements from a database, display advertisements on a GUI of a first computing device or any other device, and sending usage data to the first server. In some embodiments, the set of code may be configured to cause the media element such as the advertisement to be displayed on a GUI of a first computing device or any other device in accordance with the first attribute. The set of code may be further configured to link the media element as the advertisement to a chatbot application corresponding to the second attribute.

The chatbot application may be a software application that mimic written or spoken human speech for the purpose of simulating a conversation or interaction with a user. The chatbot application may be operated via web-based applications or it may be standalone application. The chatbot application may process and/or parse text present to said application by the user in a chat session, before responding according to a series of algorithms that interprets and identifies what the user inputted, infers what the inputted text means, and determine a series of responses based on the input received.

The chat session may involve a chatbot server executing the chatbot application and any other server such a voice server. During the chat session, the user can exchange text or other type of messages over a communication channel with the chatbot server. In the same or another communication channel, the chatbot server can send text, which the voice server can consume using a text input API. The voice server can then return text matched against a speech grammar to the chatbot server. The chatbot server can dynamically convert output of the voice server to input consumable by a speech application. Then it derives corresponding text messages that are consumable by the user.

A memory of a chatbot server may store computer readable instructions executable by a processor such as chatbot application. The processor and the memory are comprised of one or more integrated circuits (ICs), and can have a variety of structures. The processor executes the instructions of chatbot application to perform, in conjunction with the other components of first server, various functions related to receiving and responding to messages from the first computing device.

In a next step 506, a first server may receive a request from a first computing device. In response to receiving the request from the first computing device, the first server may then transmit the set of code to a second server. The second server may be configured to display (using the set of code) the media element on a second computing device operated by a second user.

The second server and the second computing device may be any computing device comprising a processor and non-transitory machine-readable storage medium, and capable of performing various tasks and processes described herein during execution. Non-limiting examples of the second server and the second computing device may include a desktop computer, a laptop computer, a tablet computer, a mobile device, and the like. The second computing device may include a display screen, which is configured to enter input data and display output data, which may be a text string, consisting of a string of characters that are drawn from a predefined alphabet. The display screen may be an LCD screen, computer monitor, or the like, which displays a graphical user interface for a second user to edit the text string. The second computing device may include an input device, such as a keyboard or touch or writable screen, and/or a cursor control device, such as mouse, trackball, or the like, for editing text string and for communicating user input information and command selections to other devices. The display screen and the input device may be directly linked to the second computing device, by a wired or wireless connection.

In some embodiments, a user of a second computing device may be directly or indirectly associated with a webserver. A webserver may be any computing device hosting a social media website accessible to the second computing device and other computing devices via the Internet. The webserver may include a processor and non-transitory machine-readable storage capable of executing the various tasks and processes described herein. Non-limiting examples of the webserver may include workstation computers, laptop computers, server computers, laptop computers, and the like. The webserver may execute software applications configured to host a social media website, which may generate and serve various social media webpages to the second computing device.

The social media website may be used to access the media element such as an advertisement stored on a database. In some implementations, the webserver may be configured to authenticate a user of the second computing device based upon a set of user authorization credentials (e.g., username, password, biometrics, cryptographic certificate). In such implementations, the webserver may access a database configured to store user credentials, which the webserver may be configured to reference in order to determine whether a set of entered credentials purportedly authenticating the user match an appropriate set of credentials that identify and authenticate the user prior to display the media element on the second computing device. Similarly, in some implementations, the webserver may generate and serve media elements on the social media webpages to the second computing device based upon a user profile within a system. In such implementations, the user profile may be defined by data fields in user records stored in the database, and authentication of the user and user profile may be conducted by the webserver by executing an access directory protocol. The webserver may then be instructed to display media content, access or generate data stored in the database, according to the user profile defined by the user record in the database.

In a non-limiting example, the first computing device may request the media element to be displayed on a social media platform operated/generated by the second server. Upon receiving this request, the first server may transmit the set of code to the second server, where the second server can utilize the set of code and display the media element. In some other embodiments, the first server may create a link for the second server to utilize the set of code without transmitting the entire set of code. In response, the second server may display the media element (e.g., advertisement) on the end user's computing device.

In a next step 508, a first server may receive a response from a second computing device indicating that the second computing device has activated with the media element. In some embodiments, a first server may receive a response from any other device associated with the second computing device indicating that the second computing device has activated with the media element.

A second computing device may be a computing device allowing a user such as a second user to interact with media elements such as advertisements on social media webpages displayed via a webserver on a GUI of the second computing device. As an example of the second computing device operation, the second computing device may execute an Internet browser that accesses a webserver hosting a social media website that allows for user to access media elements on the social media webpages advertising various products to services. Using the second computing device, a user may select a particular media element on a particular social media website to activate the particular media element. The second computing device may also issue queries or instructions to the first server via the social media webpages generated by the webserver, which then instruct the first server to perform various tasks, such as retrieving or updating a media elements from the database.

In response to receiving the indication that the second computing device has activated with the media element, the first server may then cause the second computing device to initiate a chatbot session via the chatbot application. The chatbot session may initiate a chat session between the second computing device and the first server hosting or associated with a chatbot server. In one embodiment, a communication between the second computing device and the first server occur when the user is visiting one or more social media website that hosted the activated media element that has chatbot dialog interface of the chatbot application preinstalled on the social media website. In some cases, the user may use a browser and the chatbot dialog interface to interact with the first server. In some embodiments, the user may only use a browser to interact with the first server. In some cases, the user may only use a chatbot dialog interface, which may be installed on any third-party website hosted on the second computing device to interact with the first server.

During the chatbot session, one or more bot queries may be displayed on the chatbot dialog interface in accordance with the second attribute received from the first computing device. Based on the one or more bot queries, a user may generate a request and submit the request on the chatbot application. The request may be a text string, which may include a plurality of alphanumerical characters. In response to the request, the user may receive a response on the chatbot application. The response may include a text string, which may include a plurality of alphanumerical characters arranged in a manner consistent with a request in a dialog.

A first server may be trained and/or programmed by an administrator of system to interact with users on a chatbot application via a chatbot dialog interface. The interaction with the users may correspond to generation of input messages and output messages. In one embodiment, the first server may be trained by entering sample output messages into a dialog/chat box of the chatbot dialog interface. The first server may have to transmit and display these sample output messages on the chatbot dialog interface upon receiving a first input message from a user.

For instance, the first server may receive a message on the chatbot dialog interface. The message is a user's action of browsing to a web page. In some cases, the message is activation of a media element by a user. Based on the training of the first server, the first server may determine whether the received message is a first message from the user. Upon determining that the received message is the first message from the user, then based on the training of the first server, the first server is configured to respond to the message received by the user by displaying an output message (which is pre-stored in the dialog/chat box) on the chatbot dialog interface of the chatbot application. For example, the output message "Which pizza do you want?" may be displayed on the chatbot dialog interface. This output message is a special output message, called an initial or opening message, which is only displayed in response to receipt of corresponding message of the user, which is the user's action of browsing to a web page. After the display of the output message, which is the initial or opening message, on the chatbot dialog interface, the first server may then receive one or more responses from a user operating the second computing device in response to the initial or opening message. The first server may then generate new chatbot messages by analyzing and querying the one or more responses from the user in a database according to a certain set of rules. The new chatbot messages, which are answers to the one or more responses received from the user are then transmitted and displayed on the chatbot dialog interface.

In a next step 510, a first server may transmit the one or more responses to the first computing device. The one or more responses are then displayed on a graphical user interface of the first computing device.

Example

In a non-limiting example, a first user may access a graphical user interface generated by a first server. The first user may input various attributes regarding a media element. For instance, the first user may upload an image and further provide modifications to the image (e.g., image of a pizza). The first user may also provide product data (e.g., price of the pizza, delivery information, address of the pizza shop). Furthermore, the first user may input one or more bot queries or pre-defined questions to be asked from customers. For instance, the first user may input "what toppings would you like on your pizza?" The first server may then create a set of code (utilizing JSON language in one embodiment) that represents the media element and the bot interactions. The set of code may cause a second server to display the media element and/or a chatbot application in accordance with the data inputted by the first user.

Upon receiving a request from the first user, the first server may transmit the set of code (or transmit a link therefore) to the second server. The second server may be a social networking server. The second server may utilize the set of code to display the media element. For instance, the second server may display the media element (e.g., uploaded image of the pizza) on a second computing device (e.g., computer of an end user). When the end user interacts with the media element (e.g., clicks or otherwise interacts with the media element), the second user then displays (or otherwise directs) a chatbot application corresponding to the set of code. For instance, a chatbot application is displayed on the social media platform that the displays the question inputted by the first user (e.g., "what toppings would you like on your pizza?"). The chatbot application may also communicate with the end user and provide product data when asked. For instance, when the end user asks the chatbot application regarding the pizza prices, the chatbot then retrieves the response inputted by the first user and displays the response. The chatbot may be operated by the first server and displayed on the social networking platform. In some other embodiments, the chatbot may be displayed on a third-party platform. For example, the end user may be directed to a different website. Upon executing the chatbot application, the first server may monitor end user's activities (e.g., responses and/or questions) and may transmit the end user's activities to the first computing device. For instance, the first server may transmit a transcript of the conversation to the first computing device.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What I claim is:

1. A computer-implemented method comprising:
   receiving, by a first server from a first computing device, a set of attributes for a media element comprising at least a first attribute corresponding to a graphical representation of the media element and a second attribute corresponding to one or more bot queries associated with the media element;
   generating, by the server utilizing an asynchronous browser-server communication format, a set of code representing the media element, the set of code being configured to cause the media element to be displayed in accordance with the first attribute and further configured to link the media element to a chatbot application corresponding to the second attribute;
   in response to receiving a request from the first computing device, transmitting, by the first server, the set of code to a second server that hosts a social networking platform and is configured to display the media element on a second computing device operated by a second user who is viewing the social networking platform;
   in response to receiving an indication that the second computing device has activated with the media element, causing, by the first server, the second computing device to initiate a chatbot session via the chatbot application displayed on the social networking platform, the chatbot application configured to:
      initiate the chatbot session between the second computing device and the first server,
      display one or more bot queries in accordance with the second attribute received from the first computing device, and
      receive one or more responses from the second computing device;
   transmitting, by the first server, the one or more responses to the first computing device.

2. The computer-implemented method of claim 1, wherein the chatbot application is configured to receive a request string comprising a plurality of alphanumerical characters arranged in a manner consistent with a dialog.

3. The computer-implemented method of claim 1, wherein the first attributes comprises a graphical element to be displayed within the media element.

4. The computer-implemented method of claim 1, wherein the first attribute comprises a auditory element to be played with the media element.

5. The computer-implemented method of claim 1, wherein the chatbot application is operationally controlled by the first server.

6. The computer-implemented method of claim 1, wherein the chatbot application is displayed on a third-party website.

7. The computer-implemented method of claim 1, wherein the first computing device uploads an image to be displayed as the media element.

8. The computer-implemented method of claim 7, wherein the first attribute further comprises modification data to the image.

9. The computer-implemented method of claim 1, wherein the first computing device uploads an audio file to be played along with the media element.

10. The computer-implemented method of claim 1, wherein asynchronous browser-server communication format is a JavaScript Object Notation code.

11. A computer system comprising:
    a first computing device; and
    a first server configured to:
       receive from the first computing device a set of attributes for a media element comprising at least a first attribute corresponding to a graphical representation of the media element and a second attribute corresponding to one or more bot queries associated with the media element;
       generate utilizing an asynchronous browser-server communication format, a set of code representing the media element, the set of code being configured to cause the media element to be displayed in accordance with the first attribute and further configured to link the media element to a chatbot application corresponding to the second attribute;
       in response to receiving a request from the first computing device, transmit the set of code to a second server that hosts a social networking platform and is configured to display the media element on a second computing device operated by a second user who is viewing the social networking platform;
       in response to receiving an indication that the second computing device has activated with the media element, cause the second computing device to initiate a chatbot session via the chatbot application displayed on the social networking platform, the chatbot application configured to:
          initiate the chatbot session between the second computing device and the first server,
          display one or more bot queries in accordance with the second attribute received from the first computing device, and
          receive one or more responses from the second computing device;
       transmit the one or more responses to the first computing device.

12. The computer system of claim 11, wherein the chatbot application is configured to receive a request string comprising a plurality of alphanumerical characters arranged in a manner consistent with a dialog.

13. The computer system of claim 11, wherein the first attributes comprises a graphical element to be displayed within the media element.

14. The computer system of claim 11, wherein the first attribute comprises a auditory element to be played with the media element.

15. The computer system of claim 11, wherein the chatbot application is operationally controlled by the first server.

16. The computer system of claim 11, wherein the chatbot application is displayed on a third-party website.

17. The computer system of claim 11, wherein the first computing device uploads an image to be displayed as the media element.

18. The computer system of claim 17, wherein the first attribute further comprises modification data to the image.

19. The computer system of claim 11, wherein the first computing device uploads an audio file to be played along with the media element.

20. The computer system of claim 11, wherein asynchronous browser-server communication format is a JavaScript Object Notation code.

\* \* \* \* \*